(12) United States Patent
Choy et al.

(10) Patent No.: US 9,952,601 B2
(45) Date of Patent: Apr. 24, 2018

(54) SUPERVISORY CONTROL OF AUTOMATED IRRIGATION CHANNELS

(71) Applicants: Rubicon Research Pty Ltd, Hawthorn, Victoria (AU); The University of Melbourne, Carlton, Victoria (AU)

(72) Inventors: Sumith Choy, Brunswick East (AU); Michael William Cantoni, Brunswick (AU); Peter Maxwell Dower, Northcote (AU); Michael Peter Kearney, Milton (AU)

(73) Assignees: RUBICON RESEARCH PTY LTD, Victoria (AU); UNIVERSITY OF MELBOURNE, Victoria (AU)

( * ) Notice: Subject to any disclaimer, the term of this patent is extended or adjusted under 35 U.S.C. 154(b) by 93 days.

(21) Appl. No.: 14/391,007

(22) PCT Filed: Apr. 5, 2013

(86) PCT No.: PCT/AU2013/000355
§ 371 (c)(1),
(2) Date: Oct. 6, 2014

(87) PCT Pub. No.: WO2013/149304
PCT Pub. Date: Oct. 10, 2013

(65) Prior Publication Data
US 2015/0057815 A1    Feb. 26, 2015

(30) Foreign Application Priority Data
Apr. 5, 2012 (AU) .................... 2012901378

(51) Int. Cl.
*G05D 7/06* (2006.01)
*G05B 13/04* (2006.01)
*E03B 1/02* (2006.01)

(52) U.S. Cl.
CPC ............. *G05D 7/0617* (2013.01); *E03B 1/02* (2013.01); *G05B 13/048* (2013.01)

(58) Field of Classification Search
CPC ........ G05D 7/0617; E03B 1/02; G05B 13/048
See application file for complete search history.

(56) References Cited

U.S. PATENT DOCUMENTS 4,200,911 A * 4/1980 Matsumoto ............... E03B 7/02
137/119.06
4,562,552 A * 12/1985 Miyaoka ................... E03B 7/02
137/255

(Continued)

FOREIGN PATENT DOCUMENTS

| CN | 1509426 | 6/2004 |
|---|---|---|
| CN | 101858095 | 10/2010 |

(Continued)

OTHER PUBLICATIONS

Romera, J., Ocampo-Martnez, C., Puig, V., Quevedo, J., Garca, P., and Prez, G. (2011). "Flooding management using hybrid model predictive control at the Ebro River in Spain." Proc., 8th IWA Symp. on System Analysis and Integrated Assessment, IWA, San Sebastian, Spain, 1-8.*

(Continued)

*Primary Examiner* — Carlos Ortiz Rodriguez
(74) *Attorney, Agent, or Firm* — David D. Brush; Westman, Champlin & Koehler, P.A.

(57) ABSTRACT

A method of delivery of fluid through a computer controlled fluid network, the network including; regulators to control the flow of fluid to deliver a predetermined amount thereof to at least one customer; a first control system for opening and closing the regulators, which collects data based on timed measurements of fluid levels upstream and downstream of respective regulators and the opening positions of respective regulators, using data analysis to provide models (Continued)

for prediction of fluid levels between regulators; a second control system that is a supervisory layer interacting with the first control system to provide adjustments to the controlling of the regulators based on constraint and future flow load; and a third control system interacting with the first and second control systems, which processes fluid delivery requests from the at least one customer to provide a flow load delivery schedule based on the hydraulic capacity of the network.

15 Claims, 3 Drawing Sheets

(56) References Cited

U.S. PATENT DOCUMENTS

| | | | |
|---|---|---|---|
| 4,729,106 A * | 3/1988 | Rush | G01F 1/00 137/236.1 |
| 5,472,312 A | 12/1995 | Takeda et al. | |
| 6,840,709 B2 * | 1/2005 | Dahlem | E21F 17/16 405/53 |
| 7,647,136 B2 * | 1/2010 | McDowell | F17D 3/01 137/12 |
| 2004/0156681 A1 | 8/2004 | Aughton et al. | |
| 2010/0204808 A1 | 8/2010 | Thiele | |
| 2011/0288660 A1 | 11/2011 | Wojsznis et al. | |

FOREIGN PATENT DOCUMENTS

| | | |
|---|---|---|
| CN | 102298319 | 12/2011 |
| CN | 102301290 | 12/2011 |
| EP | 2175332 | 4/2010 |
| JP | S5968415 | 4/1984 |
| WO | 02071163 | 9/2002 |
| WO | 2013016769 | 2/2013 |

OTHER PUBLICATIONS

Silva et al., "Model Predictive Control of an Experimental Water Canal", Proceedings of the European Control Conference, Jul. 2007.*

International Application No. PCT/AU2013/000355, International Search Report dated Aug. 22, 2013.

International Application No. PCT/AU2013/000355, Written Opinion dated Aug. 22, 2013.

Chinese Patent Application No. 201380024825.0, Office Action dated May 5, 2016.

European Patent Application No. 13771881.3, Search Report dated Jun. 6, 2016.

* cited by examiner

SUPERVISORY CONTROL OF AUTOMATED IRRIGATION CHANNELS

CROSS-REFERENCE TO RELATED APPLICATIONS

This application is a national stage application pursuant to 35 U.S.C. § 371 of International Application No. PCT/AU2013/000355, filed Apr. 5, 2013, which claims priority to AU Patent Application No. 2012901378, filed Apr. 5, 2012, the disclosures of which are hereby incorporated by reference herein.

FIELD OF THE INVENTION

The present invention relates to a control system for controlling the delivery of water to at least one customer through a computer controlled channel.

BACKGROUND OF THE INVENTION

In our U.S. Pat. No. 7,152,001, the entirety of which is herein incorporated, there is disclosed a computer based system for predicting the fluid level in a fluid flow network. The system has been very successful as it can use past and present measurements of parameters to predict and control fluid level and flow. The system gathers data from timed fluid levels and opening positions of regulators or valves to provide a model from which fluid levels and flow can be determined in real time. An irrigation channel is an open hydraulic system that serves to convey water from a source supply to end customers. Along the channel, flows and water levels are regulated via control gates situated at discrete points. FIG. 1 of U.S. Pat. No. 7,152,001 shows a side view of a typical channel regulated by overshot gates. The stretch of channel between gates 16, 18 is referred to as a pool. Water flows under the power of gravity, from a water source along the channel to farms. In view of this, the water levels along the channel correspond to the potential energy available to produce flow of water along the channel itself, into lateral distribution systems and onto land to be irrigated. It is therefore important to maintain the water levels above the levels required to meet flow demand.

The goal of automating an irrigation channel is to improve distribution efficiency in terms of the water taken from the supply and the water delivered to end customers. This is achieved by employing advanced instrumentation and control systems of the type shown in U.S. Pat. No. 7,152,001, which provide for a closer match between the water ordered by the farmers and the volume of the water moving through or flowing into the channel system, while maintaining the water levels along the channel system within operational limits dictated by quality of service and safety concerns.

U.S. Pat. No. 7,152,001 includes sensors 24, 26, 28, 29 and actuators linked through a Supervisory Control and Data Acquisition (SCADA) communication network 44 and advanced control practices that work in conjunction with each other to achieve high distribution efficiency, reduce transmission losses and provide high level of service to the customer/farmer thereby yielding high productivity from water which is a limited resource. When a channel is fully automated, the channel control gates 16, 18 are operated in such a manner so as to meet the demand for water downstream of the control gates 16, 18 and to maintain the water level upstream of the gate or regulator in every pool. A certain level of water must be exceeded in each pool to provide the potential energy needed to propel water further downstream, into secondary channels and onto the adjacent farms. The volume of water flowing into the channel system is controlled at the upstream or top end. The volume of water flowing into the channel is increased if a drop in the water level is sensed in a given pool or is reduced if the water level rises ensuring a constant water level is maintained.

A reactive control strategy is employed to maintain the water level in pools at their set points, e.g. control action is taken only when the controlled variable (water level in a pool) deviates from its set point. This is often referred to as feedback control. Measured flow information at the downstream regulator 18 in a pool and at the lateral off takes and at the farm outlets (if available) can be exploited to augment the feedback controller and make the control system more responsive. Often referred to as feed forward control, the upstream gate 16 sends a percentage of the measured outflows immediately rather than waiting for the flows to affect the water level in the pool and the feedback controller to take action.

The reactive control architecture described above confines the propagation of transients to upstream of changes in flow load (i.e. an out flow starting or stopping). This has merit in terms of the corresponding demand driven release of water from the upstream source; i.e. water is released from the top only when there is an out flow due to an off take downstream and this is cut off when the off take stops. However, the achievable transient performance is fundamentally limited by inherent transport delays, particularly in terms of transient peaking of control gate flow commands and deviation in water levels in response to an increase in flow load and similar undesirable effects when flow load is reduced.

FIG. 1 of the drawings shows a graph of a flow peak amplification along a channel operated using U.S. Pat. No. 7,152,001 for a 55 Megaliter/day step up 20 in flow from bottom control gate in the channel. The first and main limitation of the control strategy depicted in FIG. 1 is the limited transient flow characteristic. The peaks in the transient flows commands for the control gates 16 are amplified as the effect of a load change propagates upstream. Transient behaviour as depicted in FIG. 1 can result in actuator (i.e. control gate) saturation, thereby triggering undesired behaviour. This is the second limitation of the existing strategy used in U.S. Pat. No. 7,152,001. The mechanism to counter saturation, often called anti-windup in the control industry, is designed as an afterthought in U.S. Pat. No. 7,152,001 and this may not be very effective. In the case of long pools e.g. greater than 5 km that have limited storage volume, the flow transient may result in unacceptable water level deviations that may affect service to customers/farmers or it may violate safe operational limits. This is the third limitation of the existing strategy. The third limitation means that the existing control strategy cannot be applied to open irrigation channels with very limited freeboards. This is the fourth limitation. "Freeboard" is the height of the channel bank above the highest water level anticipated.

OBJECTS OF THE INVENTION

At least preferred forms of the invention aim to provide improvements in and for the delivery of water or at least to provide an alternative for those concerned with water delivery.

SUMMARY OF THE INVENTION

One aspect of the invention provides a control system for controlling the delivery of water to at least one customer through a computer controlled channel; the channel having a plurality of regulators responsive to flow commands to control the flow of water along the channel; and a hydraulic capacity; the control system including a first control system, a second control system and a third control system; the first control system being configured to reactively produce the flow commands to control the regulators; the third control system being configured to process fluid delivery requests from the at least one customer to provide a flow load delivery schedule; the provision of the flow load delivery schedule being based on the hydraulic capacity; the second control system being configured to provide adjustments to the control of the regulators whereby the second control system is a supervisory control layer; the provision of adjustments being based on the flow load delivery schedule and to improve transient performance. Preferably the provision of adjustments to the control of the regulators is to utilize available storage of the channel to surcharge the channel in anticipation of a future flow load change.

The first control system may be a reactive water-level regulation controller.

The provision of adjustments to the control of the regulators preferably includes providing adjustments to at least one of a) water-level references on which the production of flow commands is based and b) the flow commands. The provision of adjustments to the control of the regulators is preferably based on the constraints on water levels and future flow load. The production of flow commands may be based on measured outflow.

The second control system preferably uses model predictive control to provide pre-emptive control. The second control system may be configured to employ feedback in decision making via measured water level and flow information from the first control system.

The first control system may be configured to collect data based on timed measurements of fluid levels upstream and downstream of respective regulators and the opening positions of respective regulators; and use data analysis to provide respective models for prediction of respective fluid levels between regulators.

The control of the regulators may be to deliver a predetermined amount of fluid to said at least one customer.

The controlling of the regulators may include opening and closing the regulators under computer control.

The channel may be an irrigation channel.

Another aspect of the invention provides a delivery system including the control system; and the channel.

BRIEF DESCRIPTION OF THE DRAWINGS

The structure and functional features of a preferred embodiment of the present invention will become more apparent from the following detailed description when taken in conjunction with the accompanying drawings, in which.

DESCRIPTION OF THE PREFERRED EMBODIMENT

The preferred embodiment is an enhancement of the inventions disclosed in U.S. Pat. No. 7,152,001 and Australian Patent Application No. 2011903084, now International Patent Application No. PCT/AU2012/000907 and any patent applications based on International Patent Application No. PCT/AU2012/000907. In order to reduce repetition of description, the whole contents of U.S. Pat. No. 7,152,001 and International Patent Application No. PCT/AU2012/000907 are herein incorporated into this specification.

Figure 1:
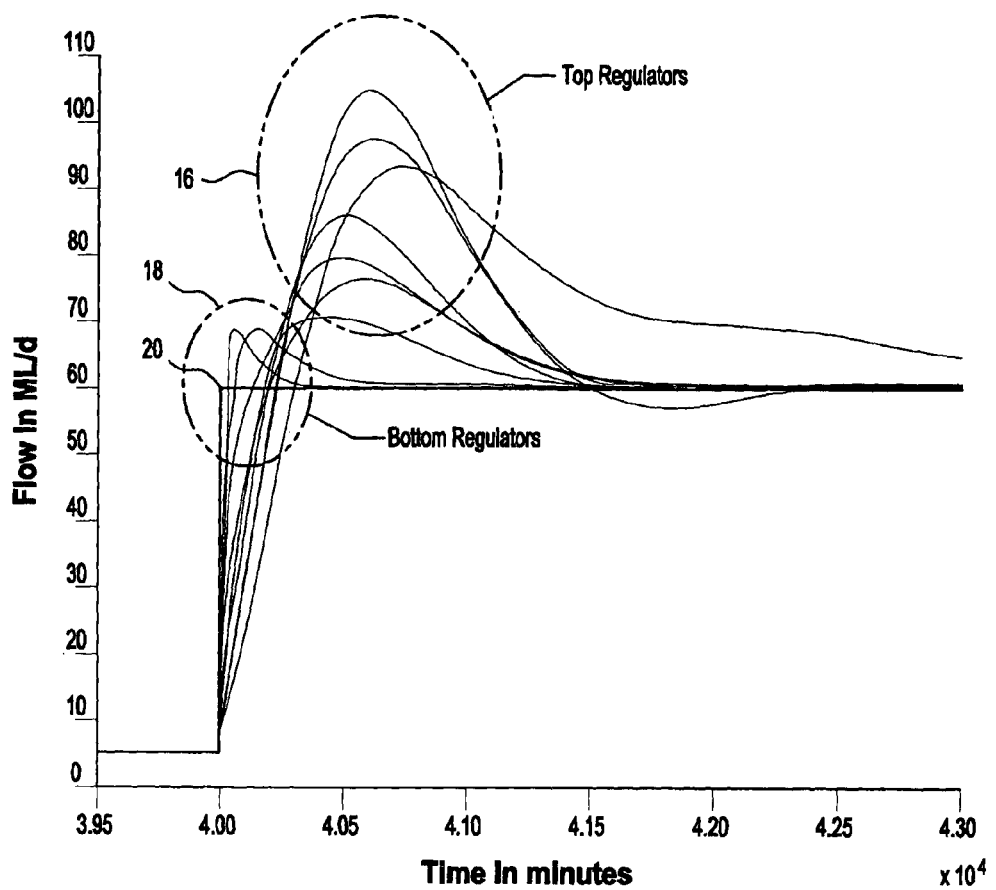
FIG. 1 shows a graph of a flow peak amplification along a channel operated using the system described in U.S. Pat. No. 7,152,001 for a 55 Megaliter per day step up in flow from the bottom most regulator.
Figure 2:
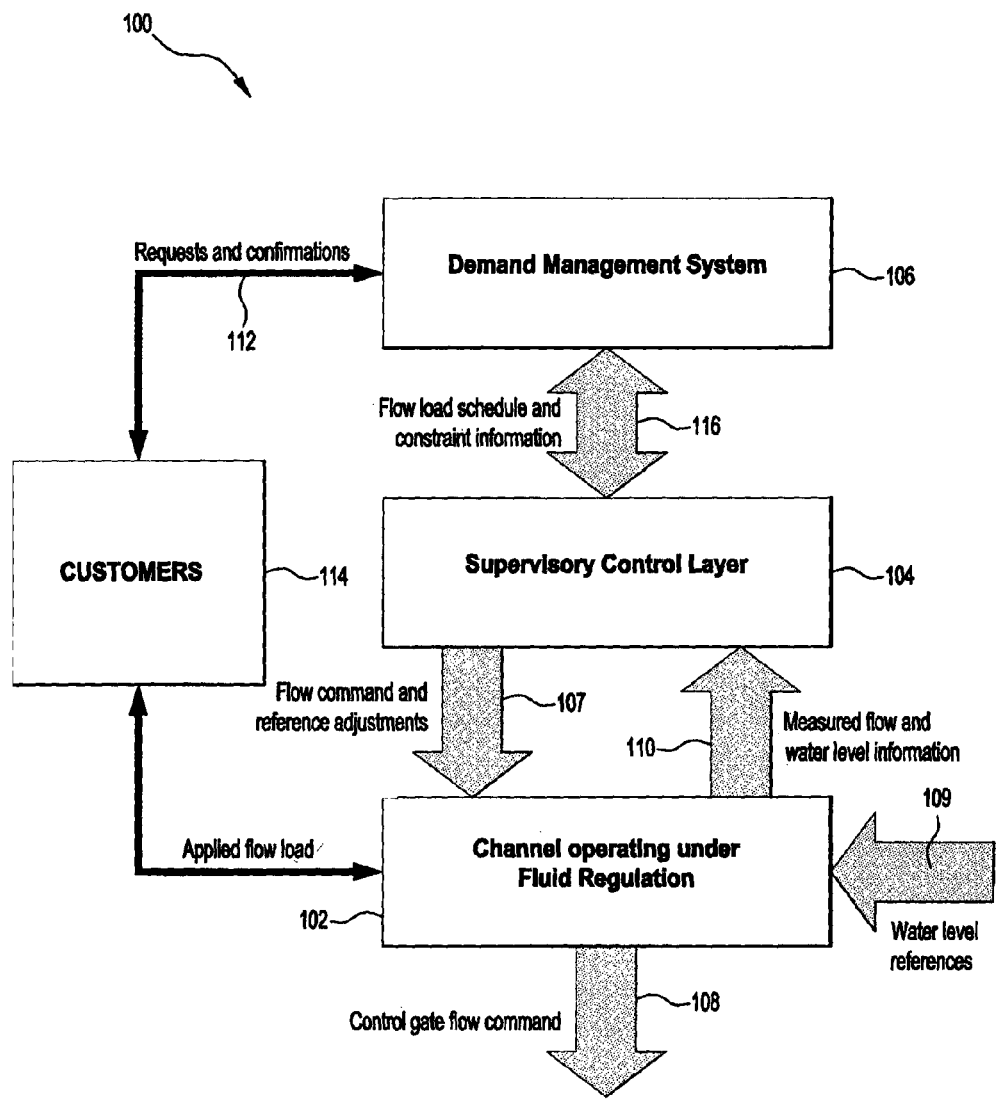
FIG. 2 is a schematic flow chart of a computer controlled fluid network.

FIG. 2 is a schematic flow chart of a computer controlled fluid network system 100 for open conduits, i.e. channel networks, especially for irrigation. The system has three (3) sub-systems, namely a first control system 102, a second control system 104 and a third control system 106. The first control system 102 is a fluid regulator system preferably of the type disclosed in U.S. Pat. No. 7,152,001 which is more fully disclosed and incorporated into this description from U.S. Pat. No. 7,152,001. The third control system 106 is a demand management system preferably of the type disclosed in International Patent Application No. PCT/AU2012/000907 which is more fully disclosed and incorporated into this description from International Patent Application No. PCT/AU2012/000907. The second control system 104 is a supervisory control system to be discussed shortly. The first control system 102 provides a control scheme and allows movement of a plurality of control gates (not shown) to set flow locally after a disturbance in the form of water level deviation or a measured outflow in the pool is observed. This operation is discussed in the preferred embodiment of U.S. Pat. No. 7,152,001. First control system 102 has control gate flow commands 108 for the opening of control gates (not shown). An approach to mitigating the limitations of reactive control architecture of this kind is to exploit available information about future flow demand. Allowing the control gate flow commands 108 produced by first control system 102 and the water level references 109 used in determining these commands to be adjusted by second control system 104, provides scope for systematically exploiting both measure off-take flows and a schedule of such flows into the future. Accordingly, the second control system 104 makes adjustments 107 to the control gate flow commands 108 and/or water-level references 109 in order to improve transient performance by ensuring the satisfaction of constraints, based on measured information and a model of the automated channel, including a representation of future flow load, such as a schedule. The second control system 104 is the middle layer in a three-tier hierarchy, with the channel operating under first control system 102 at the lowest layer and the third control system 106, the demand management system, at the highest layer. The third control system 106 processes orders 112 from customers or farmers 114 to build up a flow load schedule 116.

A preferred embodiment of the supervisory control scheme that can achieve the objectives specified above, involves the use of a receding horizon optimal control technique often called Model Predictive Control (MPC) in the open literature for the third control system 106. It is particularly well suited to supervisory control problems of the kind mentioned above. Specifically, the MPC technique can directly incorporate predictions or a schedule of the flow load (demand) over a future horizon, as well as constraints on how the water level and references may vary across time. These features are ideally suited to providing quality-of-service guarantees at supply points, flood-free operation and the avoidance of actuator saturation, which can lead to very undesirable dynamic behaviour. That is, the features are ideally suited to mitigating the four limitations of the existing first control system 102 i.e. the fluid regulator system disclosed in U.S. Pat. No. 7,152,001.

As can be seen in FIG. 2, second control system 104 has knowledge of the future flow load schedule 116 and it obtains an estimate of the state of the first control system 102, via measured water level and flow information 110. This provides scope for taking pre-emptive control action in anticipation of future load (demand) in order to achieve improved transient performance, with quality of service guarantees via the satisfaction of constraints on water levels and flows.

The control scheme of the first control system 102 provides a degree of robustness against uncertainties such as model and instrumentation inaccuracies, transportation losses and customer/farmer non-compliance with the agreed flow load schedule via feedback based control action. The second control system 104 also employs feedback in decision making via the measured water level and flow information 110.

The hierarchical architecture of the three control systems 102,104,106 provides scope for exploiting the advantages of both worlds; pre-emptive control via second control system 104 that is a supervisory control layer that exploits the knowledge of future flow demand schedule using the preferred control implemented via MPC, for example, and reactive control via first control system 102. This is a first unique aspect of the solution. The additional supervisory control layer of the second control system 104 in the hierarchy will enable further exploitation of the capability of the fluid network system by the use of available storage to surcharge the network in anticipation of a future load change, via adjustment of water-level references 109 and by varying the flow commands 108 of first control system 102.

The use of MPC techniques to implement a supervisory control layer in second control system 104 for a lower-level reactive water-level regulation controller of the first control system, with a view to exploit information regarding the load schedule agreed between the customers 114 and a demand management system in the third control system 106 so as to improve transient performance, is a second unique aspect of the solution.

As previously discussed MPC is a receding horizon optimal control technique. Within the context of FIG. 2, this means that before each update time, the adjustment to the flow command or water-level reference 107 is determined by solving a constrained optimization problem. This occurs each time the flow commands and reference water levels 107 are to be updated. The optimization problem solved at each time step involves a model for the channel operating under the first control system 102, which includes the effect of the schedule load over a prediction horizon into the future. The model is initialized using observer-based estimates of the state, derived via measurements of the water levels and flows along the channel. The optimization problem solved for each update time involves a cost function to steer the solution to desirable transient characteristics and constraints on water-levels and flows, which avoid the performance degrading effects of actuator saturation and which lead to quality of service and safe operation guarantees. The ability to make such guarantees is a third unique aspect of the solution.

The building blocks of the MPC are the channel models and controller models that underpin the design of the first control system as described in U.S. Pat. No. 7,152,001. The channel models are grey box (part physics based part data based) models with good predictive capabilities. The usage of grey box models is fourth unique aspect of the solution. A common practice in the automation industry is to use black box models based on a step response. All the abilities of the invention discussed in columns 8 and 9 of U.S. Pat. No. 7,152,001 are applicable to MPC as well since MPC is built using the models and controllers described in U.S. Pat. No. 7,152,001.

Figure 3:
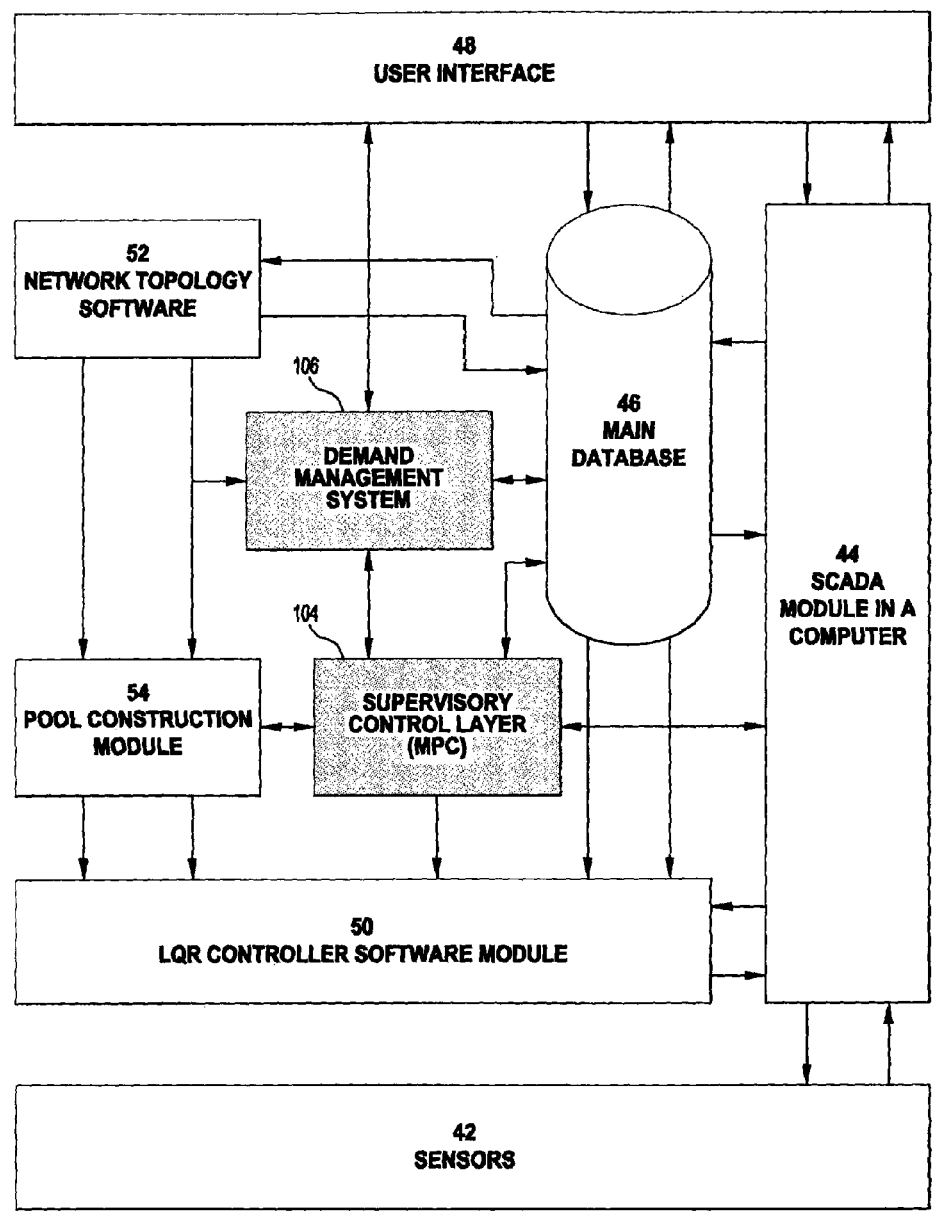
FIG. 3 is a similar view to that of FIG. 3 of U.S. Pat. No. 7,152,001.

The preferred Model Predictive Controller of second control system 104 will seamlessly integrate with the SCADA and computer environment discussed at column 6 of U.S. Pat. No. 7,152,001. A copy of "FIG. 3" from U.S. Pat. No. 7,152,001, augmented to include an MPC implementation of the supervisory control layer of second control system 104, is shown as FIG. 3 of the present application. The architecture of deploying MPC as a supervisory control layer as shown in FIG. 3 is a fifth unique aspect of the solution. FIG. 3 uses the identical reference numerals used in FIG. 3 of U.S. Pat. No. 7,152,001 and discussion of reference numerals 42 to 54 are fully described in U.S. Pat. No. 7,152,001 and do not require further repetition of description. As can be seen second control system 104 is linked to pool construction module 54, LQR controller software module, the SCADA module 44, main database 46 and third control system 106. Similarly, third control system 106 is linked to network topology software 52, second control system 102, main database 46 and user interface 48. This integration of second and third control systems provides a complete irrigation control system as opposed to the fluid regulation system of U.S. Pat. No. 7,152,001.

Glossary of Terms

"Black box model"—Model based on pure input and output behaviour of the system without any knowledge of actual physics "Demand"—Flow load on the fluid network system "Grey box model"—Model based on physics of the system and experimental data "Off-take"—A channel for taking away water. An off-take can be a farmer outlet or a secondary irrigation channel taking water off the main irrigation channel "Transient response"—behavior of a control system for a change in its load or set point "Set point"—Desired level/band at/within which the controlled variable should be maintained "Step response"—Step response is the time behavior, of the outputs of a system when its inputs change from zero to a non-zero value in a very short time The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. A control system for controlling delivery of water to at least one customer through a computer controlled channel;
   the channel having:
      a plurality of regulators responsive to flow commands to control the flow of water along the channel; and
      a hydraulic capacity;
   the control system including a first control system, a second control system and a third control system;
   the first control system being configured to reactively produce the flow commands to control the regulators in response to water level references received from the channel;
   the third control system being configured to process fluid delivery requests from the at least one customer to provide a flow load delivery schedule based on the fluid delivery requests and the hydraulic capacity;

the second control system being configured to receive the fluid delivery schedule from the third control system and provide adjustments to the control of the regulators by the first control system, whereby the second control system is a supervisory control layer;

the provision of the adjustments being based on the flow load delivery schedule and measured water level and flow information to improve transient performance.

2. The control system of claim 1 wherein the provision of adjustments is to utilize available storage of the channel to surcharge the channel in anticipation of a future flow load change.

3. The control system of claim 1 wherein the first control system is a reactive water-level regulation controller.

4. The control system of claim 1 wherein the provision of adjustments to the control of the regulators includes providing adjustments to at least one of a) water-level references on which the first control system produces the flow commands and b) the flow commands.

5. The control system of claim 4 wherein the provision of adjustments to the control of the regulators includes providing adjustments to the water-level references.

6. The control system of claim 4 wherein the provision of adjustments to the control of the regulators includes providing adjustments to the flow commands.

7. The control system of claim 4 wherein the provision of adjustments to the control of the regulators is based on the constraints on water levels and future flow load.

8. The control system of claim 1 wherein the production of flow commands is based on measured outflow.

9. The control system of claim 1 wherein the second control system uses model predictive control to provide pre-emptive control.

10. The control system of claim 1 wherein the second control system is configured to employ feedback in decision making via the measured water level and flow information, which is received from the first control system.

11. The control system of claim 1 wherein the control of the regulators is to deliver a predetermined amount of fluid to said at least one customer.

12. The control system of claim 1 wherein the controlling of the regulators includes opening and closing the regulators under computer control.

13. The control system of claim 1 wherein the channel is an irrigation channel.

14. A delivery system including
a computer controlled channel; and
a control system for controlling delivery of water to at least one customer through the channel;
the channel having:
a plurality of regulators responsive to flow commands to control the flow of water along the channel; and
a hydraulic capacity;

the control system including a first control system, a second control system and a third control system;

the first control system being configured to reactively produce the flow commands to control the regulators in response to water level references received from the channel;

the third control system being configured to process fluid delivery requests from the at least one customer to provide a flow load delivery schedule based on the fluid delivery requests and the hydraulic capacity;

the second control system being configured to receive the fluid delivery schedule from the third control system and provide adjustments to the control of the regulators by the first control system, whereby the second control system is a supervisory control layer;

the provision of the adjustments being based on the flow load delivery schedule and measured water level and flow information to improve transient performance.

15. A control system for controlling delivery of water to at least one customer through a computer controlled channel;
the channel having:
a plurality of regulators responsive to flow commands to control the flow of water along the channel; and
a hydraulic capacity;

the control system including a first control system, a second control system and a third control system;

the first control system being configured to reactively produce the flow commands to control the regulators in response to water level references received from the channel;

the third control system being configured to process fluid delivery requests from the at least one customer to provide a flow load delivery schedule based on the fluid delivery requests and the hydraulic capacity;

the second control system being configured to receive the fluid delivery schedule from the third control system and provide adjustments to the flow commands produced by the first control system or to the water level references for adjusting control of the regulators by the first control system, whereby the second control system is a supervisory control layer;

the provision of the adjustments being based on the flow load delivery schedule and measured water level and flow information to improve transient performance.

* * * * *